INVENTOR.
ALFRED H. FAULKNER
BY [signature]
ATTY.

INVENTOR.
ALFRED H. FAULKNER
BY Mc Watters Owen
ATTY.

INVENTOR.
ALFRED H. FAULKNER
BY [signature]
ATTY.

INVENTOR.
ALFRED H. FAULKNER
BY Wm. Walter Owen
ATTY.

INVENTOR.
ALFRED H. FAULKNER

BY Wm. Walter Owen

ATTY.

INVENTOR.
ALFRED H. FAULKNER
BY Wm. Walter Owen.
ATTY.

TELEPHONE INSTRUMENT UTILIZING TRANSISTOR AMPLIFIER
Filed Oct. 6, 1954 7 Sheets-Sheet 7
FIG. 10
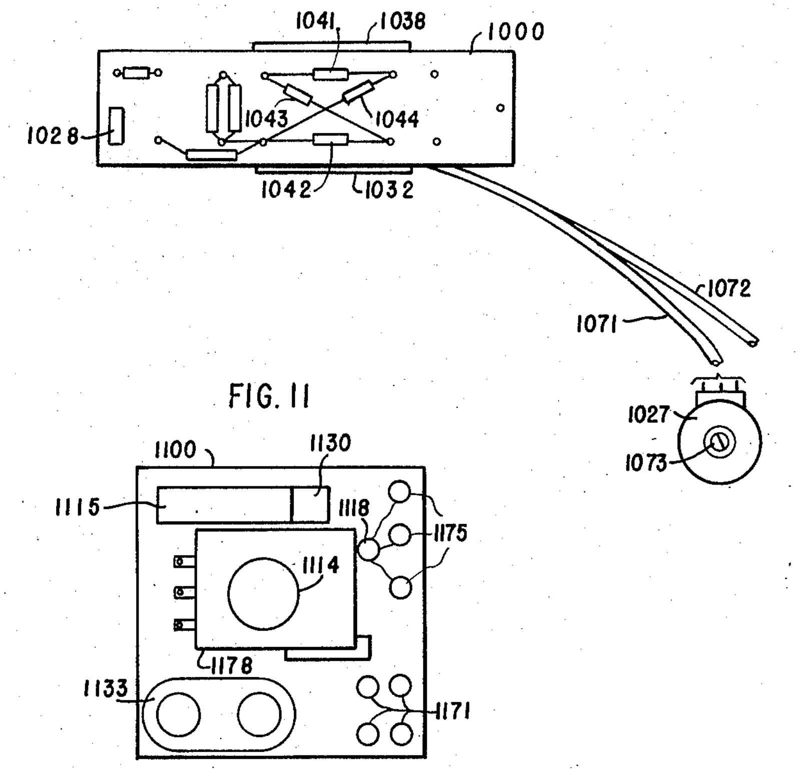
FIG. 10, FIG. 11
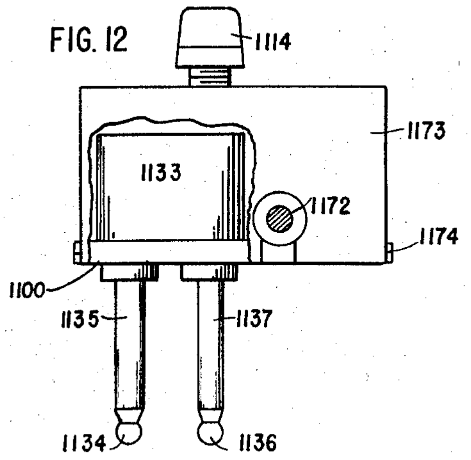
FIG. 12
INVENTOR.
ALFRED H. FAULKNER
BY Wm Walter Owen
ATTY.

United States Patent Office 2,885,483

Patented May 5, 1959

2,885,483

TELEPHONE INSTRUMENT UTILIZING TRANSISTOR AMPLIFIER

Alfred H. Faulkner, Chicago, Ill., assignor to General Telephone Laboratories, Incorporated, a corporation of Delaware Application October 6, 1954, Serial No. 460,574

19 Claims. (Cl. 179—81)

This invention relates to telephone instruments and more particularly relates to subsets and operators' headsets for use in telephone systems. More specifically yet the invention concerns itself with the use of amplifiers in conjunction with such instrumentalities.

In accordance with one of its aspects it is a broad object of the invention to provide a novel telephone instrument of the subset or headset type which has improved receiving efficiency and is, therefore, suited for use by the hard-of-hearing.

More specifically an object of the invention resides in the provision of a circuit arrangement, whereby a transistor amplifier is integrated with the circuit elements of such a telephone instrument in such a way that amplification of the voice currents incoming to that instrument is facilitated without the use of a special power source for the amplifier.

It is also a particular object of the invention to provide an arrangement, wherein a transistor amplifier serving for the amplification of incoming voice currents may be incorporated in an equipment unit, such as a substation housing or a headset plug, of a conventional telephone instrument so that separate external equipment assemblies are not required for accommodating the amplifier and its associated parts. In this connection it is another specific object of the invention to provide a transistor amplifier which may readily be added to a conventional telephone instrument to convert this instrument to one of improved receiving efficiency.

According to one feature of the invention the D.C. bias potentials or currents for the various electrodes of the transistor amplifier in the receiving path of the subset or headset type telephone instrument are derived from the source of direct current, e.g. the central battery, which supplies the required direct current feed to the carbon transmitter of this instrument; and to this end a resistance network or voltage divider is interposed at that instrument in the connecting circuit, the line circuit in the case of a substation, over which this D.C. feed is obtained.

In the instance of the transistor-equipped substation there is also interposed in the instrument end of that circuit a bridge-type rectifier, preferably consisting of a number of crystal diodes, which maintains the aforementioned bias potentials at the proper polarity regardless of the polarity with which the central battery is connected to the far end of the line. This insures the proper functioning of the amplifier also when used on lines employing battery reversal in conjunction with metering, paystation operation and the like. Care is taken, moreover, that the provision of this rectifier does not interfere with the ringing operation or with the multiple use of the ringer condenser for spark quenching purposes. According to yet another feature the receiving amplifier of this substation is closely integrated with an anti-side tone circuit of the conventional type.

While the transistor amplifier of this substation for the hard-of-hearing is designed for mounting inside the housing of the subset, the headset type instrument also disclosed herein has its receiving amplifier mounted in a small housing forming part of the switchboard plug assembly associated with the headset. A volume control knob accessible from the outside of the housing is provided in either case. In the instance of the subset, volume control is obtained by regulating the amount of inverse feedback of the voice frequency signal.

In accordance with another aspect of the invention another broad object thereof resides in the provision of a novel telephone instrument with improved transmitting, and if desired, also improved receiving performance, particularly for use in noisy locations. While ordinary telephone instruments employing carbon transmitters are fully satisfactory in general telephone applications it has been found that the signal-to-noise ratio of telephonic transmission can be improved and especially the noise pick-up in noisy surroundings reduced if the carbon transmitter is replaced by a transmitter of greater fidelity, for example, a transmitter of the magnetic type. However, since the output level of such transmitters is relatively low they require the use of an amplifier.

In this context a specific object of the invention consists in the provision of a transistor amplifier arrangement for amplifying the output of the high-fidelity transmitter of a telephone instrument, again preferably without the employment of special power sources or separate equipment units.

D.C. operating power for this amplifier again is obtained from the central battery by way of the line conductors and, preferably a rectifier of the crystal diode type. According to a feature of the invention the transmitter of this telephone instrument is of the magnetic receiver type so that two receiver capsules of substantially the same design may be used at both ends of the handset, and the transistor amplifier includes an equalizing network to compensate for the drop in response of such a permanent magnet-type transmitter near the lower end of the voice frequency range.

More specifically, the transistor amplifier comprises two stages of the grounded emitter type and employs direct coupling between the two stages which makes for a very simple and inexpensive design. The above equalizing network is connected in series with the load resistance of the first stage transistor. Inverse feedback of the signal currents is provided by means of a cathode follower resistance in series with the emitter of the second stage so that the input resistance of this stage is high. The input circuit of this stage accordingly has only a negligible shunting effect on the equalizing network interposed in the load circuit of the first stage and this, in turn, simplifies the structure of this network.

Because of the high impedance of the collector circuit of a transistor amplifier as compared with the impedance of a carbon transmitter, the conventional anti-side tone circuit does not lend itself very well for use in conjunction with such an amplifier in the transmitting path of a telephone instrument. An anti-side tone circuit of novel design has, therefore, been used in this case. This circuit employs an induction coil with three windings of which one is included in the output circuit of the second stage transistor in series with the aforementioned emitter resistance, while another is in circuit with the subscribers line. The receiver is differentially connected to this emitter resistance and the third winding of the induction coil so that the signal voltage developed across this resistance in cathode-follower fashion and the voltage induced in the last-mentioned winding of the induction coil are substantially balanced against each other with respect to the receiver. The aforementioned emitter resistance is also used in a novel manner to produce inverse direct current feedback extending over both stages. This overall direct current feedback insures the necessary stabilization of the operating points of both transistors—a result that would otherwise be difficult to achieve in view of the direct coupling between the two stages.

The invention, both as to its organization and method of operation, together with other objects and features thereof, will best be understood by reference to the following specification taken in connection with the accompanying drawings. In these drawings:

Fig. 10 is the top view of a transistor amplifier assembly for a substation such as shown in Fig. 1, 2 or 3. Fig. 10 also shows the associated volume control resistance and the connecting cables.

Fig. 11 is a top view, of the switchboard plug assembly, Fig. 8, including the transistor amplifier but with the housing or cover of this assembly removed.

Fig. 12 is a side view of the switchboard plug assembly, Fig. 11, with the cover in place.

Figure 2:
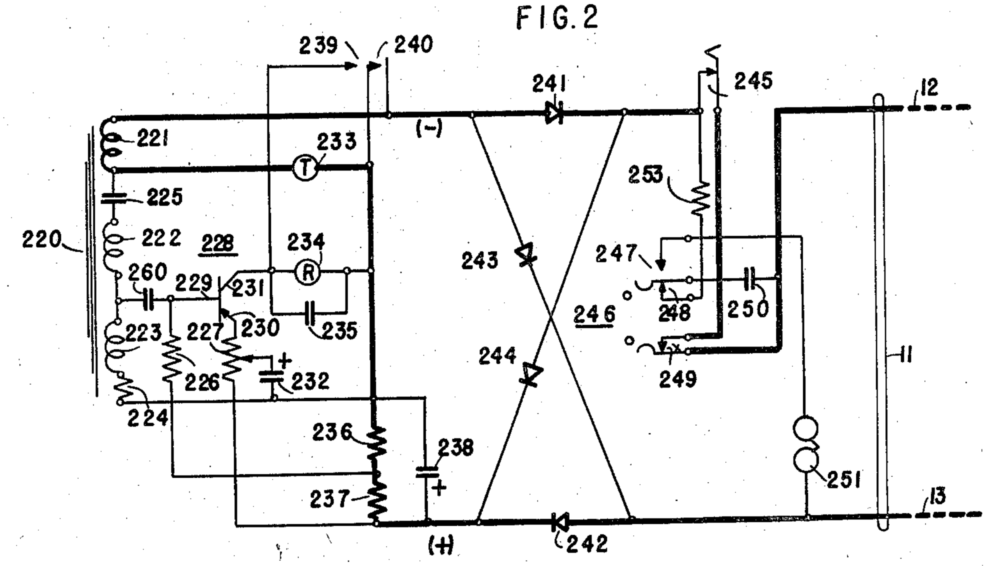
Fig. 2 is a modification of the circuit according to Fig. 1 in which all of the voltage divider supplying the necessary bias potentials to the transistor electrodes is located outside of the local or balancing part of the transmitter circuit.
Figure 3:
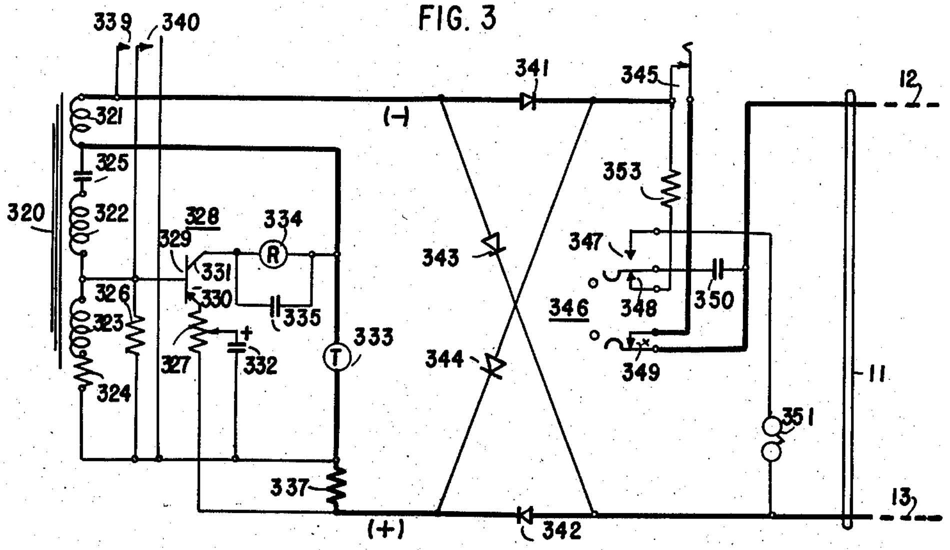
Fig. 3 is a modification of the circuit shown in Fig. 1 in which the transmitter itself is used as a section of the voltage divider supplying the necessary bias potentials to the transistor electrodes.
Figure 4:
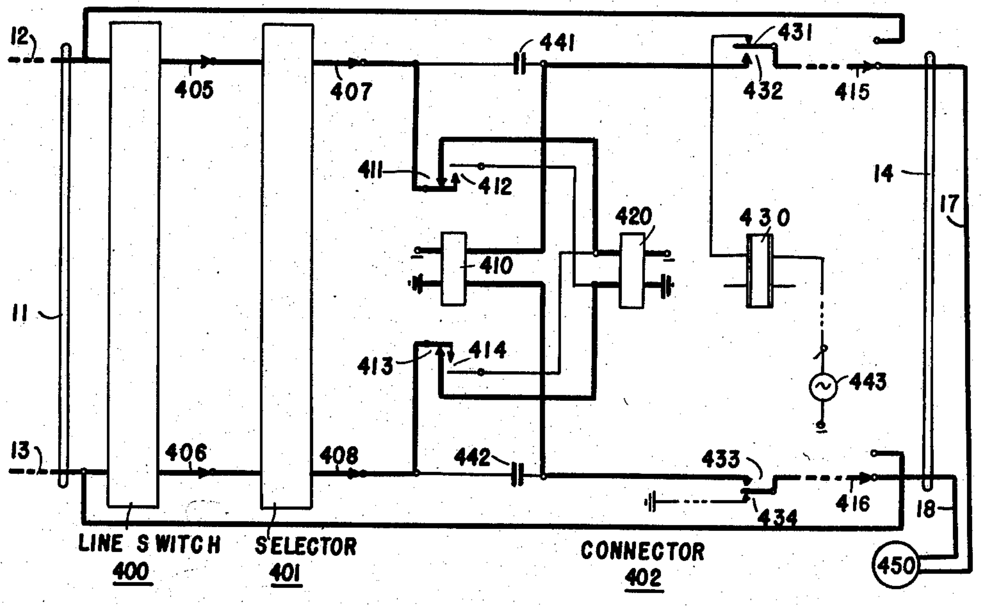
Fig. 4 is a schematic representation of the central office equipment showing, in particular, the calling and called bridge and the ringing current supply means associated with a connector. A called subscriber's station and line is also schematically indicated in this figure.
Figure 7:
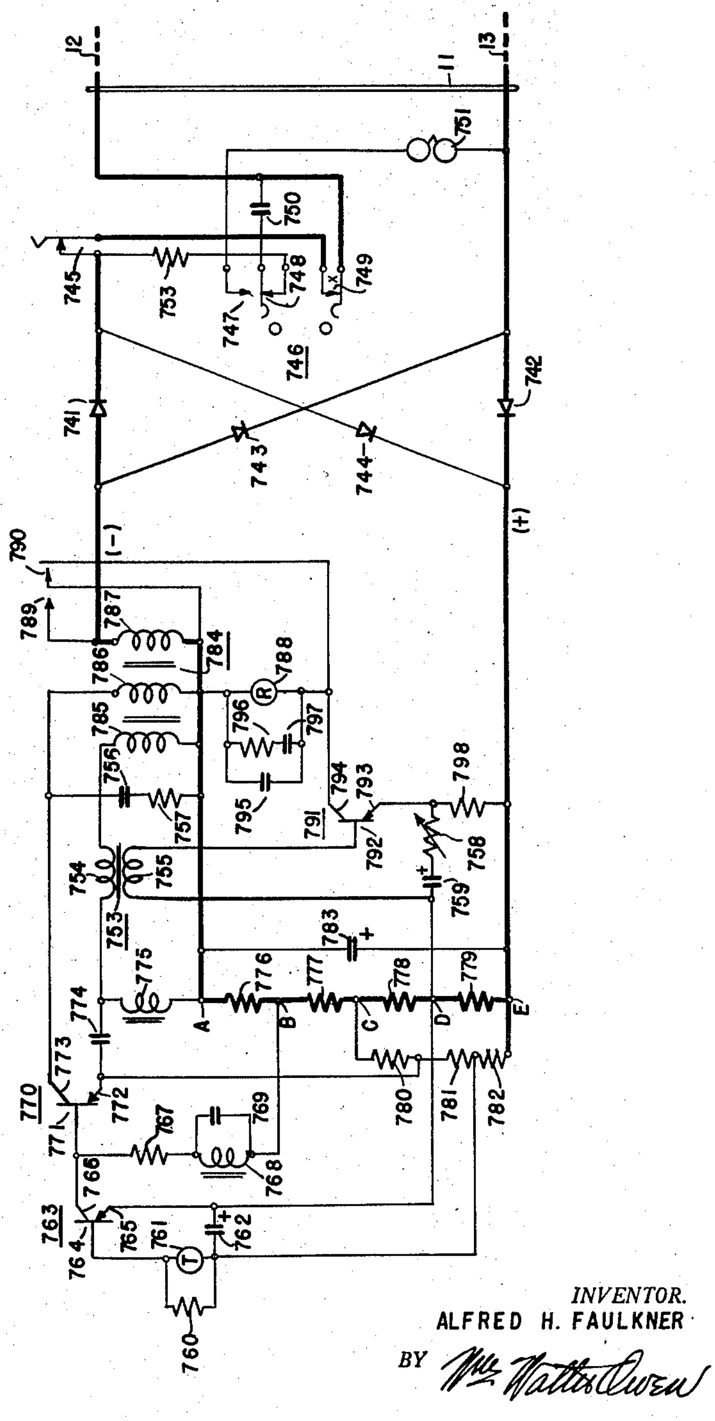
Fig. 7 is the circuit diagram of a central battery substation similar to Fig. 5 but with the addition of a single stage transistor amplifier in the receiving path.
Figure 8:
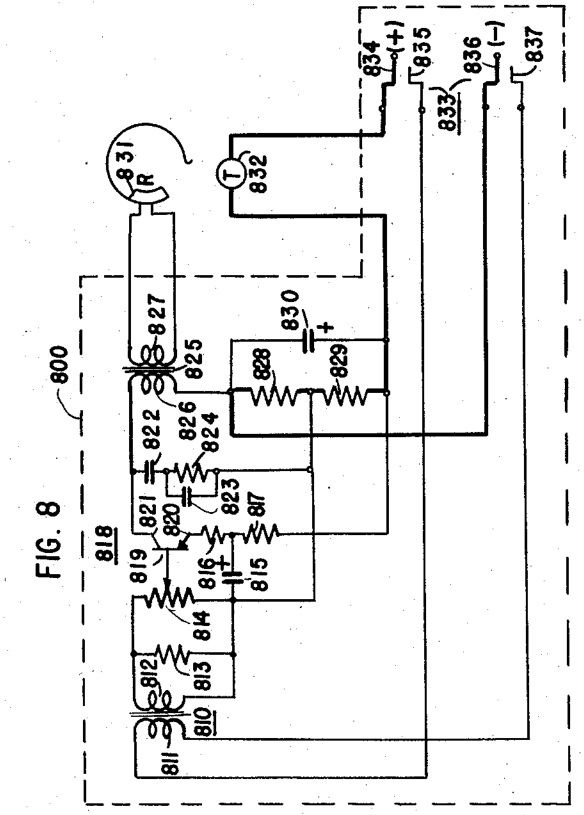
Fig. 8 shows the circuit diagram of an operator's headset with associated switchboard plug and a single stage transistor amplifier in the receiving circuit for improving the effectiveness of the headset in receiving incoming voice currents.

Fig. 4 should be placed to the right of Fig. 1, 2, 3, 5 or 7 and Fig. 9 to the right of Fig. 8 to show an operable circuit arrangement.

Before the telephone instruments illustrated in the drawings are described in detail some general remarks about the transistors used in the amplifiers of these instruments will be in order. These transistors are designated with the numerals 128 in Fig. 1, 228 in Fig. 2, 328 in Fig. 3, 563 and 570 in Fig. 5, 763 and 770 and 791 in Fig. 7, 818 in Fig. 8, 1028 in Fig. 10 and 1118 in Fig. 11.

The term transistor has become established in the art for denoting a translating device having a body of semiconductive material such as germanium or silicon and a base electrode, an emitter electrode and a collector electrode in contact with that body. The base electrode is generally in large area, low resistance contact with the semi-conductive body while the emitter and collector each form a rectifying junction with this body, the emitter being electrically biased in the forward direction and the collector in the reverse direction. Depending on the physical structure of these two rectifying junctions, transistors are usually classified as either point contact transistors or junction transistors. Because of their less-than-unity current amplification factor and their suitability for high power dissipation, junction transistors are the preferred type for voice frequency amplifier application but the invention should not be construed as limited to this class of transistors.

In amplifier work three basic types of circuit arrangements are in use for transistors which have become known as the grounded base circuit, the grounded emitter circuit and the grounded collector circuit depending on the transistor electrode which is common to both signal input and output circuits. Thus the aforementioned three circuits are somewhat analogous to the grounded grid, grounded cathode and grounded plate circuit of the vacuum tube art. In the embodiments of the invention disclosed herein each transistor involved is used in a grounded emitter circuit; for example, the signal or voice frequency input circuit of the transistor 128 in Fig. 1 includes its base 129 and emitter 130 and the signal output circuit of this transistor includes its collector 131 and emitter 130. However, it should be understood that the invention in some of its phases may also be practiced with one of the other two circuit configurations.

In the present disclosure utilization of a P–N–P type junction transistor has been assumed, i.e. a junction transistor in which a thin center zone of N-type semiconductive material which forms the base of the transistor is provided intermediate two outer zones of P-type material which respectively act as emitter and collector. The P–N–P character of the transistor is brought out in the drawings by the direction of the arrowhead of the emitter symbol which points toward the base, corresponding to the fact that in a P–N–P transistor the emitter is biased positively and the collector negatively with respect to the base. Instead of a P–N–P transistor an N–P–N transistor could, of course, also be used and in that case the foregoing potential would have to be reversed. With regard to the basic properties of such junction transistors reference is made to an article by R. L. Wallace and W. J. Pietenpol, published in the I.R.E. Proceedings for July 1951, pp 753–767, entitled "Some Circuit Properties and Applications of N–P–N Transistors."

Figure 1:
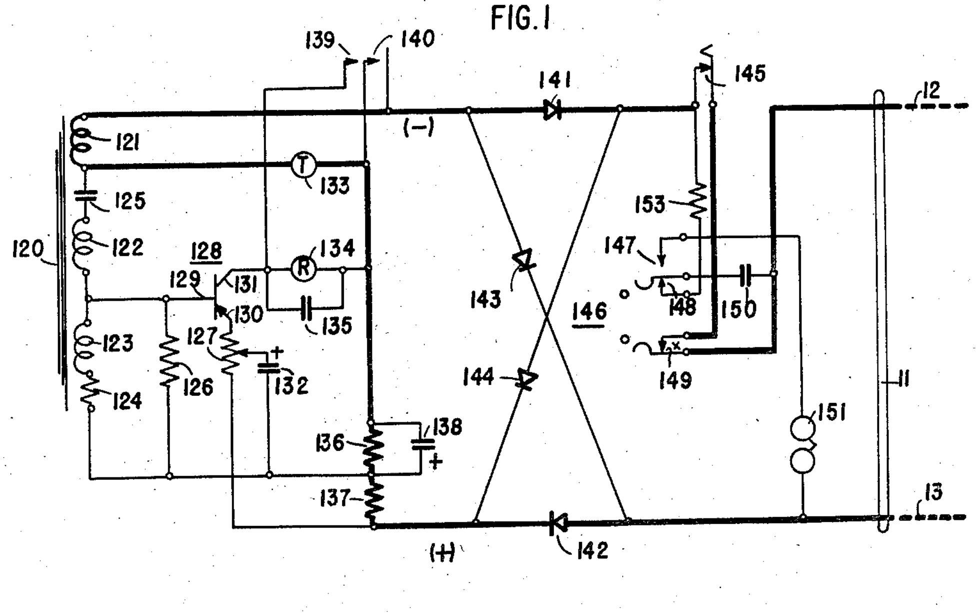
Fig. 1 is the circuit diagram of a central battery type substation having a single stage transistor amplifier in its receiving path for improved receiving efficiency.

Referring now to Fig. 1, there is shown the circuit of a central battery substation of generally conventional design except for the transistor amplifier included in its receiving path and the components required for the operation of this amplifier. More particularly the substation circuit, Fig. 1, comprises a handset including transmitter 133 and receiver 134, a three-winding anti-side tone induction coil 120, a dial equipped with impulse springs 145 and shunt springs 139, 140, a switch hook contact assembly 146, ringer 151, ringer condenser 150, and spark protection resistance 153. Associated with transistor 128 there is, among other circuit components, a voltage divider 136, 137 and a bridge connected rectifier including crystal diodes 141 to 144 which may, for example, be of the germanium type.

The substation, Fig. 1, is connected to the central office equipment, Fig. 4, by means of a subscribers line 11 comprising line conductors 12 and 13. The central office may be of any well known design, but for purposes of illustration it is assumed in Fig. 4 to include a line switch 400 associated with subscribers line 11, a selector 401, and a connector 402. Only those parts of the central office equipment have been shown in Fig. 4 that are deemed essential for an understanding of the invention. Thus as to connector 402, only the calling bridge including line relay 420, the called bridge including back bridge relay 410, the ring cut-off relay 430 and the ringing generator 443 associated with the connector have been shown. For further details reference is made, for example, to United States Patent 1,905,765 which issued to V. S. Tharp on April 25, 1933.

When the subscriber at the substation, Fig. 1, lifts his receiver the subscriber's loop is closed by way of switch hook contacts 148, 149, the switch hook contact assembly being shown in Fig. 1 in the receiver-off position, and the associated line switch 400 in the central office, Fig. 4, is caused to search for an idle selector in the well known manner. Assuming selector 401 to be the one found the subscriber then dials the first digit, whereby the corresponding interruptions of the line circuit at 145 cause this selector to be set on the desired group of connector trunks. Condenser 150 in series with resistance 153 is bridged across impulse springs 145 for purposes of spark protection. Shunt springs 139, 140 close on this and any following actuations of the dial.

The selector then searches for an idle connector in the selected group in the manner well known in the art. Assuming that connector 402 is the idle connector found, the following battery-feed circuit shown in heavy lines is now completed over the subscriber's loop: ground, lower winding of connector line relay 420, Fig. 4, contact 413, wiper 408, selector 401, wiper 406, line switch 400, line conductor 13, diode 142, voltage divider sections 137 and 136, transmitter 133, line winding 121 of induction coil 120, diode 141, impulse contact 145, switch hook contact 149, line conductor 12, line switch 400, wiper 405, selector 401, wiper 407, contact 411, upper winding of connector line relay 420, battery. The substation portion of the loop circuit which was initially closed over the line relay, not shown, of line switch 400 and of the loop circuit subsequently closed over the line relay, also not shown, of selector 401, is of course, the same as the corresponding portion of the circuit just traced.

The calling subscriber then transmits the final digit of the called subscriber's number, thereby setting the connector wipers on the line 14, of the called subscriber's station, 450, in the conventional manner. If this subscribers line is idle ringing current is transmitted to substation 450 by way of battery-connected generator 443, upper winding of ring cut-off relay 430, contact 431, wiper 415, line conductor 17, condenser and ringer not shown at called substation 450, line conductor 18, wiper 416, contact 434, ground. When the called party answers ring cut-off relay 430 operates in the well known manner so that the called subscriber's loop is now completed by way of relay contacts 432 and 433 to back bridge relay 410. Relay 410 in operating at contacts 411, 412 and 413, 414 reverses the polarity of the calling side of the connection in the well known manner, such as for metering or supervisory purposes, so that line conductor 13, Fig. 1, is now connected to battery and conductor 12 to ground. However, in spite of this current reversal bridge type rectifier 141 to 144 maintains the direct current potentials at the left-hand or output terminals of the rectifier the same as they were prior to this reversal, that is positive potential is maintained at the bottom terminal of voltage divider section 137 and a relatively negative potential at the top terminal of section 136, all as viewed in Fig. 1. In this manner the setting up of the proper bias potentials for the electrodes of transistor 128 by means of voltage divider 136, 137 is insured regardless of the polarity with which the central office battery may be connected to the far end of the subscriber's line.

The conversation between the calling and the called subscriber by way of condensers 441, 442, Fig. 4 can now begin. Before proceeding with a detailed description of the voice frequency transmitting and receiving paths in Fig. 1 it should be mentioned that the transistor amplifier of the substaition, Fig. 1, has been integrated in a skillful manner with an anti-side tone circuit of substantially standard design. Thus, induction coil 120 comprises, in addition to its primary or line winding 121, a secondary winding 122 and also a tertiary or anti-side tone winding 123 having a relatively high resistance 124 incorporated therein. Windings 121, 122 and 123 are referred to herein as primary, secondary and tertiary merely because of the order in which they appear in the circuit diagram, Fig. 1. All three windings are connected in series with each other, winding 122 being wound in an aiding sense and winding 123 in an opposing sense with respect to line winding 121 this line winding having a comparatively high number of turns. The transmitter 133 is connected to a point intermediate the primary and secondary winding, and a resistance 126 which is shunted by the input circuit traced below of the transistor amplifier is connected to a point intermediate the secondary and tertiary winding of the induction coil; resistance 126 thus takes the place of the receiver in a conventional anti-side tone circuit. A circuit of this general structure can be designed for anti-side tone balance, that is so that for a line of a given average impedance the signal current in the receiving path, in the instant case through resistance 126, is zero during transmission in the outgoing direction; and by a proper selection of the winding characteristics this result can be obtained without a sacrifice in transmitting or receiving efficiency as compared with a corresponding circuit having no anti-side tone performance. A standard substation circuit incorporating an anti-side tone circuit of this kind is described, for example, in United States Patent 2,214,259, to H. C. Pye, issued on September 10, 1940.

In the instant case the signal voltages produced across the transmitter 133 during transmission in the outgoing direction give rise to the flow of signal currents in two circuits of which the first extends over the subscribers line while the second is a local circuit. The first of these two circuits may be traced as follows: left-hand terminal of transmitter 133, line winding 121, rectifier diode 143, line conductor 13, lower talking conductor, including condenser 442, of the central office equipment, Fig. 4, line conductor 18, substation 450, line conductor 17, upper talking conductor, including condenser 441, of the central office equipment, line conductor 12, contacts 149 and 145, diode 144, voltage divider section 137, electrolytic by-pass condenser 138 in shunt with section 136, right-hand terminal of transmitter 133. The second-mentioned or local circuit extends as follows: left-hand terminal of transmitter 133, condenser 125, induction coil windings 122, 123, 124, condenser 138 in shunt with voltage divider section 136, right-hand terminal of transmitter 133. The voltages in line winding 121 induced by the current flowing through winding 122 in this local circuit aid the current flowing through winding 121 directly, whereby the well-known booster effect is achieved. On the other hand, because of the balancing voltage induced in winding 123 the current through resistance 126 is zero, hence no signal voltages are impressed on the transistor amplifier during transmission in the outgoing direction, that is, the signal current in the receiver also is zero.

Voltage divider section 136 is by-passed in Fig. 1 by the high-value condenser 138 to avoid loss in transmission, this section being included in the above-traced local circuit. Since voltage divider section 137, on the other hand, is in series with the relatively high impedance line it has a negligible effect on transmission and is accordingly not by-passed. With regard to diodes 143 and 144 which are included in the first-traced or line circuit attention is called to the fact that these two diodes are the ones conducting subsequent to the polarity reversal described above, and these particular diodes remain conducting throughout speech transmission since the speech signal voltages are small compared with the D.C. voltage of the exchange battery. As, therefore, rectifier 141—144 is merely employed as a D.C. switching element and is not used for the rectification of alternating currents, rectifier element of very small dimensions may be used for units 141—144.

Before turning to the operation of the transistor amplifier in amplifying voice frequency signals received over the subscribers line in the incoming direction the functioning of the resistance network associated with the transistor in supplying its electrodes with the necessary D.C. bias potentials will first be explained. As will be seen from Fig. 1 these potentials are derived from the voltage drops across the two sections of the voltage divider 136, 137 in the D.C. loop. More particularly the emitter 130 is connected to the bottom terminal as viewed in Fig. 1 of section 137 by way of the relatively high resistance 127, the collector 131 to the top terminal of section 136 by way of receiver 134, and the junction point of the two sections is connected to the base 129 by way of resistance 126 which is in shunt with windings 123, 124 of the induction coil. The values of these resistances may be, for example, 50, 25, 1200 and 150 ohms for resistors 136, 137, 127 and 126 respectively.

In this manner the emitter is biased positively and the collector negatively with respect to the base as required for a transistor of the P–N–P variety. The base-to-emitter bias voltage required for transistors of the type assumed is only small, usually a mere fraction of a volt, and this voltage is obtained in Fig. 1 as the difference between the relatively high voltage across voltage divider section 137 and the likewise high but opposing voltage drop across resistor 127, this last mentioned IR drop being due to the flow of the emitter current through resistance 127. In this connection it should be remembered that in a junction transistor the emitter current is high compared with the base current, the latter being merely equal to the difference between the emitter and collector currents and the last-mentioned two currents, in turn, being nearly equal to each other; and as the base current is of low magnitude the voltage drop across resistance 126 is negligible and the potential at the base, therefore, roughly the same as that of the junction point of voltage divider sections 136, 137. The result is that a substantially constant bias current is set up through the emitter-base path of the transistor which is largely independent of variations in the transistor constants such as variations due to temperature changes. This current is self-stabilizing by virtue of the fact that a tendency of the emitter current to, say, increase would, because of the increased IR drop in resistance 127, tend to make the emitter potential less positive with respect to the base; and this would by virtue of the transistor mechanism itself tend to, in turn, reduce the emitter current. In this way resistance 127 may be said to produce a direct current inverse feedback effect in the bias supply to transistor 128.

In the conventional anti-side tone circuit a condenser similar to condenser 125 is interposed between the primary and secondary winding of the induction coil for the purpose of keeping direct current in the loop circuit from flowing through the secondary and tertiary windings. In the circuit according to Fig. 1 this condenser 125 has the additional function of facilitating the setting up of different bias potentials at the base 129 and the collector 131 of the transistor. In the absence of condenser 125 these potentials would tend to equalize each other by way of winding 122 and transmitter 133.

The incoming speech signal is developed in the substation circuit, Fig. 1, across resistance 126 and is due to the flow of voice frequency currents in a line circuit extending from line conductor 12 by way of contacts 149 and 145, diode 144, voltage divider section 137, resistance 126, winding 122, condenser 125, winding 121, diode 143, line conductor 13. As in the case of the conventional anti-side tone circuit, a bridge of the receiving circuit extends through the transmitter branch, that is, in the present instance through transmitter 133 and condenser 138. The incoming signal voltage developed across resistance 126 in the manner just described is impressed on the transistor input circuit which includes base 129, emitter 130, the upper portion of resistance 127 and large-value electrolytic condenser 132. The voice frequency signal impressed on this input circuit appears in amplified form in the transistor output circuit which extends from collector 131 through receiver 134, electrolytic condensers 138 and 132 in series and the upper portion of resistance 127 to emitter 130. Because of the high output resistance of the transistor the winding of receiver 134 preferably is also of high impedance, that is, a regular high-impedance receiver is preferably used.

It will be understood from the foregoing description that the upper portion of resistance 127 as viewed in Fig. 1 is common to both the signal input and signal output circuit of transistor 128 so that this section of resistance 127 produces inverse feedback of signal current, thereby reducing the gain. Resistance 127 may, therefore, be used as a volume control device. More particularly, the lower the setting of the sliding contact of this resistance as viewed in Fig. 1 the more of this resistance is included in this common portion of the amplifier circuit and the more reduction in gain accordingly is obtained. It will be appreciated that to this extent resistance 127 is used in the circuit, Fig. 1, both for direct current and signal current feedback purposes. Since the receiver used in the instant case constitutes a high reactance load the high frequencies tend to be overemphasized at reduced gain settings, and therefore a small capacitor 135 is shunted across the receiver to compensate for this effect.

Tests have shown that the value of resistance 126 which in Fig. 1 is shown bridged across induction coil windings 123, 124 for simulating the impedance of the receiver branch of a standard anti-side tone circuit is not critical. If this resistance is omitted more gain is obtained without the anti-side tone balance being appreciably affected. If the gain of the amplifier, for any reason, becomes too high for other-than-average values of line impedance to safely prevent acoustic feedback at high volume control settings, with the receiver removed from the ear, by-pass condenser 138 may be omitted, if desired to increase the loss around the local transmitting circuit described above.

If the substation shown in Fig. 1 is the called station in a given connection ringing current is transmitted to this station from connector 402 over the following circuit: battery-connected ringing generator 443, Fig. 4, upper winding of ring cut-off relay 430, contact 431, wiper 415, line conductor 12, condenser 150, Fig. 1, hook switch contact 147 in closed condition, ringer 151, line conductor 13, wiper 416, Fig. 4, contact 434, ground. As hook switch 146 and ringer 151 together with its condenser 150 are connected to the line side of bridge rectifier 141 to 144, the rectifier does not interfere with the proper reception of this ringing current. Also, ringer condenser 150 may be multiple-used for spark protection purposes during dialling and during switch hook operations as shown in Fig. 1, the same as in a substation circuit of conventional design. However, while the impulse springs 145 of the dial are thus disposed on the line side of rectifier 141 to 144, shunt springs 139, 140 are located on the induction coil side of this rectifier as shown in Fig. 1 to cause both the receiver and the series connection of transmitter 133 and line winding 121 to be shorted out during dialling.

Figs. 2 and 3 are modifications of the substation circuit Fig. 1 and as many of the circuit components in these figures correspond to similar components in Fig. 1 the same reference numerals have been used for these components with the exception of the first digit which is 2 or 3 instead of 1. In the case of the modification according to Fig. 2 both sections of the voltage divider 236, 237 are disposed outside of the local transmitter circuit, thereby minimizing any loss in transmisison efficiency that may be caused by the upper section of this voltage divider. This modification necessitates the addition of a blocking condenser 260 to permit different direct current bias potentials to be maintained on base 229 and collector 231 of the transistor 228, that is, to prevent an equalizing path between these two potential points to be set up by way of winding 223, 224. In the case of Fig. 2 by-pass condenser 238, moreover, is shunted across both sections 236, 237 of the voltage divider, thereby further lowering the circuit losses. Condenser 238 may be omitted if the loss due to the connection of sections 236 and 237 in series with the line is not objectionable, however the signal voltage which will appear across section 236 acts on the base 229 of the transistor through resistance 226, thus reducing the effectiveness of the anti-side tone circuit. This effect may be minimized by using a relatively high value, say 1500 ohms, for resistance 226.

The arrangement shown in Fig. 3 also is similar to that illustrated in Fig. 1 except that voltage divider section 136 and by-pass condenser 138 have been entirely eliminated. In Fig. 3, the transmitter 333 itself is employed in lieu of the upper section of the voltage divider, that is, the voltage drop across the transmitter is used to furnish the required negative collector potential for the transistor 328. In this connection it should be pointed out that while the direct current resistance of the transmitter is apt to vary over a relatively wide range the transistor can tolerate a wide variation in collector voltage. The signal voltage appearing across the transmitter during transmission in the outgoing direction is impressed on the receiver in series with the collector resistance of the transistor but since this resistance is very high little side tone results from this connection.

Fig. 10 illustrates the physical appearance of the transistor amplifier assembly for a substation such as shown in Figs. 1, 2 or 3. As indicated in Fig. 10 the components of the transistor amplifier are mounted on both sides of a small terminal strip 1000 of insulating material. On the top of this terminal strip which is shown in this figure there is mounted the transistor itself, correspondingly designated 1028 in Fig. 10, the germanium diodes 1041—1044 and a part of the voltage divider and other resistances associated with the transistor. The condensers such as 1032 and 1038 and the remainder of the resistance network with the exception of the volume control resistance are mounted on the opposite side of the terminal strip. Because of its extremely small dimensions, for example, 3½" long, 1⁵⁄₁₆" wide and about 1" thick, this assembly can readily be mounted in the housing of a substation of standard design.

Cables 1071 and 1072, Fig. 10, schematically indicate the various connecting wires by means of which the amplifier assembly is connected inside the housing with the volume control resistance 1027 and with the remaining circuit components of the substation including the handset. The volume control resistance is preferably mounted on the rear sloping wall of the subset so that it may be actuated from the outside of the subset housing by a knob mounted on the shaft 1073 of that control resistance.

From the foregoing it will be appreciated, moreover, that by the mere addition of the equipment shown in Fig. 10 and some minor modifications in wiring a standard substation may without difficulty be converted into one suitable for use by the hard-of-hearing.

Figure 5:
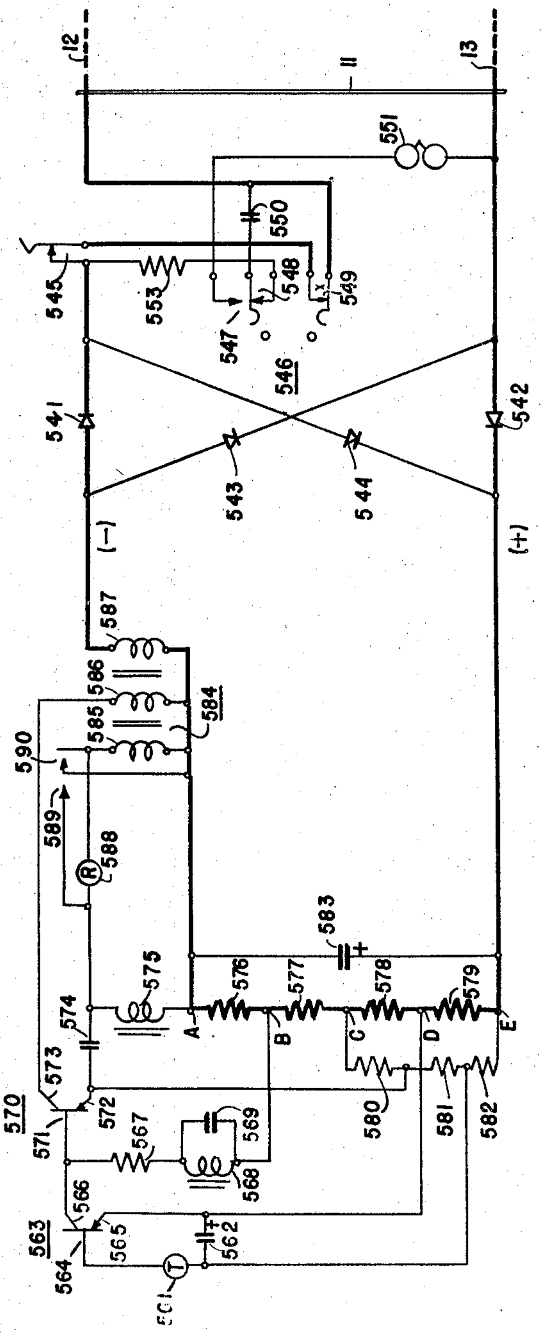
Fig. 5 is the circuit diagram of a central battery substation employing a permanent magnet type transmitter in conjunction with a two stage transistor amplifier in the transmitting path and also utilizing a novel anti-side tone circuit.

Turning now to Fig. 5, there is shown the circuit of a central battery type substation which employs a high-fidelity transmitter and hence is particularly suited for use in noisy locations. The transmitter 561 is of the permanent magnet type, i.e. a standard telephone receiver capsule, mounted in the handset in lieu of the conventional carbon transmitter capsule may be employed as the transmitter in this case. In order to make up for the relatively low output level of magnetic transmitter 561 there is provided in the transmitting path, of the substation circuit, i.e. between transmitter 561 and induction coil 584 a two-stage direct-coupled amplifier including transistors 563, 570 and their associated circuit components. Receiver 588 is of standard design but the anti-side tone circuit in which it is used is novel.

Resistors 576—579 which are all of a relatively low resistance value form a voltage divider which is interposed in the loop circuit and serves to provide the electrodes of transistors 563, 570 with the necessary bias potentials. This voltage divider is by-passed by a large-value electrolytic condenser 583 to avoid the introduction of objectionable loss in the path of speech signals.

The circuit elements shown in the right-hand portion of Fig. 5 and including rectifier diodes 541—544, and impulse springs 545, hook switch 546 and ringer 551 with associated components correspond to those used in the substation Fig. 1 and have therefore, been designated by similar reference numerals. Subscribers line 11 connects the subset, Fig. 5, with the central office equipment shown in Fig. 4.

When the handset is removed from the cradle the hook switch contact, 546, is in the position shown in Fig. 5 and the direct current loop is closed over line 11. This loop circuit which again is indicated by heavy lines includes in this instance the four sections of the voltage divider and the primary or line winding 587 of induction coil 584 in series. Bridge-type rectifier 541—544 maintains the polarity indicated in Fig. 5 across this series combination in spite of reversal of the line current, in the manner explained above in connection with Fig. 1.

Bridged across sections 578, 579 of the voltage divider there is a series arrangement of three relatively high resistances 580, 581, 582 which serve to provide for inverse direct current feedback over both stages of this direct coupled transistor amplifier, thereby to stabilize the operating points of both transistors. As will be seen from Fig. 5 the base 564 of the first-stage transistor is connected by way of transmitter 561 to the junction of resistors 581, 582; the emitter 565 of this transistor is connected to the junction, designated D, of voltage divider sections 578, 579; the collector 566 of this transistor, in addition to being physically connected to the base 571 of second-stage transistor 570, is connected to the junction B of voltage divider sections 576 and 577, viz. via high-value load resistance 567 and inductance 568 which forms part of an equalizing network 568, 569; the emitter 572 of the second-stage transistor 570 is connected to the junction of resistors 580, 581; and the collector 573 of this transistor is connected by way of the secondary winding 586 of induction coil 584 to the uppermost terminal A of the voltage divider. Resistor 581 thus interconnects base 564 and emitter 572 but as this interconnection is of high resistance it does not interfere with the setting up of different bias as well as signal potentials at these two electrodes. The following are typical values for the resistances involved:

| | Ohms |
|---|---|
| Resistance **576** | 50 |
| Resistance **577** | 50 |
| Resistance **578** | 10 |
| Resistance **579** | 20 |
| Resistance **580** | 1,200 |
| Resistance **581** | 4,000 |
| Resistance **582** | 4,000 |
| Resistance **567** | 3,300 |

Assuming further, for purposes of illustration, that the direct current flowing over line conductors 12, 13 is 100 milliamperes, ignoring the effect of the small transistor biasing currents on the voltage divider potentials and letting all potentials be referred to point E it will readily be seen that the potential at D and hence at emitter 565 is —2 volts; and that the potentials at C, B and A are —3, —8 and —13 volts respectively. The potential at first stage collector 566 and hence at second stage base 571 differs from that at B mainly by the voltage drop due to the collector current flow through load resistance 567; and the potential at second stage emitter 572 and also that at first stage base 564 are determined by the potentials at points C and E in conjunction with the voltage drops across high-value resistances 580—582 primarily due to the flow of second stage emitter current therethrough. Due to those voltage drops the circuit acts to stabilize itself in the assumed example with a potential at first stage base 564 which is, in fact, slightly more negative than the —2 volt potential at point D and emitter 565 as required for proper transistor operation; and similarly with a potential, say —4.2 volts, which is developed at first stage collector 566 and second stage base 571.

The automatic stabilizing action of this arrangement may be explained as follows: if the bias potential at collector 566 and base 571 tends to drift towards a more negative value the second stage emitter current will tend to rise, and since a portion of this current flows through resistances 582 and 581 from bottom to top as viewed in Fig. 5, the potential at first stage base 564 is driven more negative. The resultant tendency of the first stage collector current to rise will tend to increase the voltage drop across load resistance 567, thereby tending to shift the potential at 566 and 571 back in the positive direction. In this fashion the operating points of both transistors are automatically stabilized in spite of variations in the transistor parameters. In the absence of this overall direct current feedback, a change in the operating point of one transistor for example due to temperature changes would, because of the direct coupling between the two stages, tend to bring about an amplified change in the operating point of the other transistor and this would make stable operation of the amplifier difficult or impossible.

Figure 6:
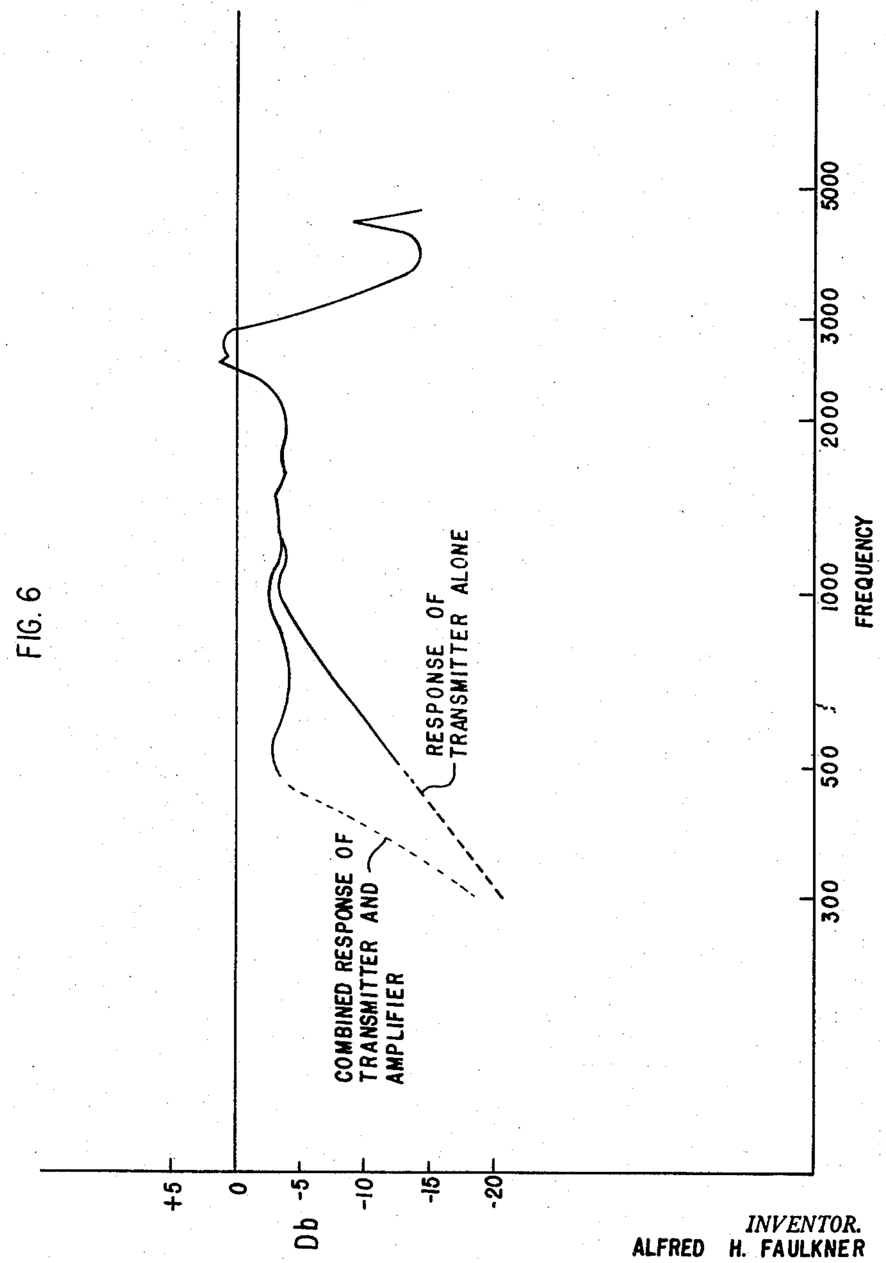
Fig. 6 is a graph illustrating the overall response of the transmitter amplifier combination shown in Fig. 5 as compared with the response of the transmitter alone.

Speech signals generated by transmitter 561 are impressed between the base 564 and emitter 565 of the first stage transistor by way of electrolytic by-pass condenser 562 which shunts the D.C. feedback resistors 580–582 for speech signals to avoid loss of gain in the voice range. The resulting speech currents flowing in the signal input circuit appear in amplified form in the signal output circuit of the first stage transistor which extends from collector 566 to emitter 565 and includes high-value load resistance 567 equalizing network 568, 569 and portions of the low resistance voltage divider in series. This equalizing network has the simple form of a parallel resonant circuit tuned to approximately 500 cycles per second, choke 568 being, for example, of 1 henry and condenser 569 of .1 microfarad. As the Q of this resonant circuit is quite low a gradual boost in signal level from about 1000 c.p.s. down to 500 c.p.s. is obtained to compensate for the droop in response of magnetic transmitter 561 in this region. Fig. 6 illustrates the effect of this equalizer on the overall response. As shown in this figure a maximum boost of about 10 decibel is provided at 500 c.p.s. while above 1000 c.p.s. the response of the amplifier is essentially flat. The zero db reference level is arbitrary on the curves shown in Fig. 6.

The above-mentioned output circuit of the first stage transistor is shunted by the signal input path of the second stage transistor which path includes base 571, emitter 572, high-value resistance 580 in parallel with 581, 582, and portions of the low resistance voltage divider, resistance 582, however, being without effect in this case as it is shunted by by-pass condenser 562. The input resistance of a transistor is normally in the order of 1000 ohms, but in this instance the parallel combination of resistances 580 and 581 which being directly in series with emitter 572 is common to both the input and output circuit of the second stage transistor, produces an inverse feedback of signal current around this stage which raises the input resistance of transistor 570 to above 30,000 ohms. It is by virtue of this high input resistance and the corresponding reduction in shunting effect of the second stage input path that an equalizing network 568, 569 of such simple structure can be employed.

Perhaps more important yet, use is made of the inverse feedback of signal current provided by resistances 580, 581 for purposes of anti-side tone performance, viz. as follows: due to the large emitter circuit resistance, the speech signals at the emitter of transistor 570 are substantially equal to the base signal of this transistor, somewhat as in a cathode follower. The signal output circuit of the second stage transistor extends from collector 573 through secondary winding 586 of induction coil 584, portions of the low resistance voltage divider, high-value resistances 580 and 581 in parallel, to emitter 572. The current flowing through this circuit is equal to the voltage at the emitter divided by the impedance in this circuit which is substantially equal to the parallel resistance of resistors 580 and 581 at 1,000 c.p.s. As this current flows through winding 586 it induces signal voltages both in primary winding 587 and tertiary winding 585 of the induction coil. More particularly, the turns ratio of the coil windings is chosen so that with an 800 ohm load across line winding 587 the signal voltage induced in winding 585 is equal to the opposite signal voltage across resistance combination 580–581. As the two voltages just mentioned balance each other the outgoing speech signals do not appear across the receiver. Typical winding data for induction coil 584 are as follows:

| | |
|---|---|
| Winding **585** | 670 turns, No. 32EC. |
| Winding **587** | 1,500 turns, No. 30EC. |
| Winding **586** | 4,500 turns, No. 35EC. |

If the induction coil was an ideal transformer this balance would be maintained over the entire speech range, assuming the line presents a resistance load. Since the direct line current must flow through winding 587 it is necessary to provide the core of induction coil 584 with an air gap. The exciting reactance of the induction coil, therefore, is rather low and this would tend to produce a phase shift in the voltage across winding 585 at low frequencies which would destroy the balance. Inductor 575 has been provided to compensate for this effect of the induction coil. This inductor which may have a value of less than .7 henry is bridged across the emitter circuit and acts to shift the phase of the emitter collector current at low frequencies in a direction and by an amount designed to maintain the desired balance between the emitter voltage and that at the upper terminal of winding 585. Choke 575 is preferably in the form of a tiny ferrite cup core unit. Blocking condenser 574 is used to avoid the flow of direct current through this miniature choke as well as through receiver 588 and it also functions to separate emitter 572 and collector 573 from the direct current standpoint which is essential for maintaining the desired operating potentials on these electrodes.

During reception, the speech currents flowing through winding 587 induce signal voltages in both windings 586 and 585. Since the collector resistance of the second stage transistor is very high there is substantially no load on winding 586. This transistor behaves somewhat like a cathode follower acting to maintain its emitter voltage constant, hence most of the incoming signal voltage developed across winding 585 appears across the receiver.

The current in the branch of the receiver circuit including the emitter of transistor 570 flows through the emitter collector path and thence through winding 586. This causes the impedance presented to the line to be different from that which would be obtained if the receiver was connected directly across winding 585. However, the loss introduced by this effect is not greater than that due to the flow of incoming signal currents through the transmitter of an ordinary subset and as a result the receiving level of a substation according to Fig. 5 is substantially the same as that of a conventional instrument. During dialling both the receiver and winding 585 are short-circuited at shunt springs 589, 590 associated with the dial.

The substation circuit shown in Fig. 7 is similar to that of Fig. 5 except that a single stage transistor amplifier generally similar to that used in Figs. 1–3 has been added in the receiving path to provide for amplification of incoming speech. Reference numerals similar to those in Fig. 5 have been used in Fig. 7 for the designation of corresponding circuit elements.

In lieu of the receiver of Fig. 5, the primary winding 754 of a 1:1 transformer 753 is connected in Fig. 7, in series with blocking condenser 774, between emitter 772 and the upper terminal of tertiary winding 785 of induction coil 784. The secondary winding 755 of transformer 753 impresses the incoming signal voltage on the input circuit of receiving transistor 791, this signal input circuit including base 792 and emitter 793 of this transistor, variable resistance 758 and electrolytic condenser 759. The signal output circuit of this transistor extends principally from collector 794 through high-impedance receiver 788, condenser 783, section 779 of the low-resistance voltage divider condenser 759, variable resistance 758 to emitter 793. Variable resistance 758 being common to both the signal input and output circuits introduces inverse feedback of speech currents and may, therefore, be used for volume control purposes. The emitter, base and collector bias potentials for transistor 791 are derived from points E, D and A respectively of voltage divider 776—779 as shown but the emitter bias connection includes a high-value resistance 798 which acts to stabilize the direct current bias for the input electrodes of this transistor in a way similar to resistance 127, Fig. 1. It will be noted, however, that in the circuit of Fig. 7 inverse feedback of signal current and of direct current are provided substantially by two separate resistors, viz. 758 and 798 respectively. The various resistors involved in the transistor bias supply for substation circuit, Fig. 7, may have the following values, for example:

| | Ohms |
|---|---|
| Resistance 776 | 47 |
| Resistance 777 | 47 |
| Resistance 778 | 10 |
| Resistance 779 | 47 |
| Resistance 780 | 2,200 |
| Resistance 781 | 3,900 |
| Resistance 782 | 8,200 |
| Resistance 767 | 3,900 |
| Resistance 758 | 1,500 |
| Resistance 798 | 1,200 |

In Fig. 7 a somewhat more elaborate compensating network than in Fig. 1 is connected across the high-impedance receiver, this network comprising the series combination of a condenser and resistance and an additional condenser in shunt with this combination. Condensers 797 and 795 may, for instance, be of .25 and .02 mf. respectively and resistance 796 may be 1,000 ohms. The purpose of this network is to equalize the collector load in the voice-frequency range, and to "roll-off" the response above approximately 3,000 c.p.s. The absence of peaks in the response allows more gain without acoustic feedback between the receiver and transmitter. The connection of a phase-correcting network comprising condenser 756 and resistance 757 across induction coil winding 786, and of a resistance 760 of, say, 560 ohms across transmitter 761 also help to prevent spurious oscillations from being generated by the amplifiers of Fig. 7. During the operation of the dial, induction coil winding 787 and receiver 788 are short-circuited by dial shunt springs 789, 790.

Referring now to Fig. 8 there is shown the circuit of a headset-type instrument having a transistor amplifier in the receiving channel for improved receiving efficiency. The instrument shown in Fig. 8 comprises a headset of conventional design including the receiver 831 and carbon transmitter 832. The switch board plug 833 associated with this headset by way of a four-conductor cord is, in itself, also of standard design but in this instance and as more particularly shown in Figs. 11 and 12 the aforementioned transistor amplifier including transistor 818 and associated parts is mounted as a part of the plug assembly, the latter being designated as 800 in Fig. 8. The plug itself is a twin plug having a total of four conducting portions, the transmitting or battery-feed circuit of the instrument extending over the tip portions 834, 836 and the receiving circuit extending over the sleeve portions 835, 837 of the plug. As in the case of Fig. 1 a voltage divider, designated 828, 829 in Fig. 8 is interposed in the battery-feed circuit for the carbon transmitter to provide the necessary bias potentials for the transistor in the receiving path.

Figure 9:
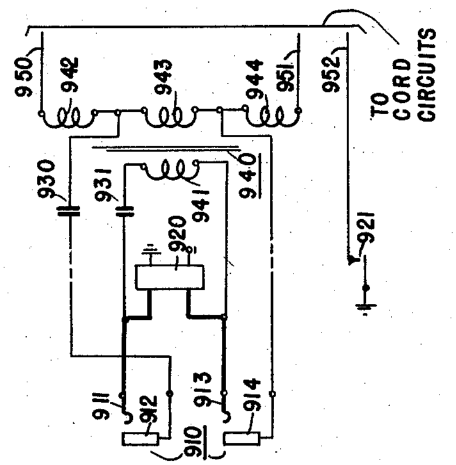
Fig. 9 shows the switchboard equipment and particularly the anti-side tone induction coil and battery feed relay used in conjunction with Fig. 8.

The switch board equipment associated with this instrument is of ordinary structure and is shown in Fig. 9 as comprising operator's jack 910, line relay 920, anti-side tone induction coil 940 and condensers 930, 931. As will be seen from Fig. 9 the transmitting circuit is connected by way of condenser 931 to winding 941 of the induction coil while the receiving circuit is connected via condenser 930 across high-resistance winding 943, the latter winding, in turn, being interposed between low-resistance windings 942 and 944. All three windings 942, 943 and 944 are connected across talking conductors 950, 951 which connect the induction coil with the cord circuits, not shown, of the switch board. In this manner, the receiving circuit is, in effect, placed in the diagonal of a Wheatstone bridge of which one arm is formed by winding 943, another by the series combination of windings 942 and 944, a third by the line impedance terminating conductors 950, 951 and a fourth by the corresponding resistance incorporated in winding 943. With this bridge in balance, transmitting voltages induced in windings 942—944 from winding 941, therefore, will give rise to the flow of signal current over conductors 950, 951 but no current will flow over the above-mentioned receiving circuit. The battery feed circuit for transmitter 832 which is completed upon insertion of plug 833 in jack 910 is shown in heavy lines in Figs. 8 and 9. This circuit may be traced as follows: ground, upper winding of relay 920, tip portions 911 and 834 of jack 910 and plug 833 respectively, transmitter 832, sections 829 and 828 of the voltage divider in series, tip portions 836 and 913 of plug 833 and jack 910 respectively, lower winding of relay 920, battery. Line relay 920 operates in this circuit to complete at its contact 921 a control circuit, only partially shown, which extends over conductor 952. Electrolytic condenser 830 is bridged across voltage divider 828, 829 to avoid transmission losses.

The receiving circuit which is effective in the transmission of speech in the incoming direction extends from conductor 950 by way of induction coil winding 942, condenser 930, sleeve portions 912 and 835, primary winding 811 of transformer 810, sleeve portions 837, 914, induction coil winding 944, to conductor 951. Transformer 810 is an insulating transformer having a 1:1 winding ratio. An insulating transformer is used in the present instance to isolate the input circuit of the transistor amplifier from the exchange battery, since resistance battery is sometimes connected to the talking leads in the switch board for pad control purposes. The voltage induced in the secondary winding 812 of transformer 810 is impressed in shunt with resistance 813 on potentiometer 814 which serves as the volume control means for the amplifier shown in Fig. 8, and a part of this voltage depending on the setting of the potentiometer slider is then impressed on the transistor input circuit including base 819, emitter 820, resistance 816 and electrolytic condenser 815.

The transistor output circuit extends mainly from collector 821 via primary 826 of output transformer 825, the upper section of low-resistance voltage divider 828, 829, condenser 815, resistance 816, to emitter 820. Resistance 816, being common to both input and output circuit, introduces a small and, in this instance, fixed amount of inverse feedback of signal current. The amplified signal voltages induced in the secondary winding 827 of output transformer 825 are impressed on receiver 831. Output transformer 825 has a step-down ratio of roughly 10:1, thereby matching the high output resistance of transistor 818 to the relatively low impedance of the receiver of a standard operator's headset. Condensers 822, 823 and resistance 824 form a compensating network connected, in effect, across primary winding 826. This network is similar in structure and purpose to compensating network 795—797, Fig. 7.

Emitter 820 is supplied with a positive bias potential from the bottom terminal of voltage divider section 829, viz. by way of resistances 817 and 816; collector 821 is furnished a relatively negative operating potential from the upper terminal of section 828, via transformer winding 826; and base 819 is connected, via the lower portion of potentiometer 814, to the junction of voltage divider sections 828 and 829 and thus receives a bias potential intermediate the other two as required in transistor operation. Resistance 817 which is included in the above-traced emitter bias connection is of relatively high value and therefore, functions to automatically stabilize the operating point of the transistor in a manner similar to that explained in connection with Fig. 1. Suitable values for the resistances involved are:

| | Ohms |
|---|---|
| Resistance 829 | 18 |
| Resistance 828 | 82 |
| Resistance 817 | 1,800 |
| Resistance 816 | 100 |

Figs. 11 and 12 are, respectively, a top view and a side view of the plug assembly for this headset-type instrument. As shown in these figures the various components of the transistor amplifier are mounted on a base plate 1100 of insulating material which, in turn, is fastened between the body or grip 1133 and the prongs 1134, 1135 and 1136, 1137 of a conventional switch board plug. The aforementioned components include the transistor 1118 and its associated terminals 1175, the volume control potentiometer having an operating knob 1114 which extends to the outside of the housing formed by cover 1173, and electrolytic condensers 1115, 1130. Other components are obstructed from view in Fig. 11 by mounting bracket 1178 of the potentiometer. 1171 are four screw terminals terminating cord 1172 which interconnects the plug assembly with the headset proper. Cover 1173 is secured to mounting plate 1100 by means of screws 1174. In use, the plug assembly is plugged into the operator's jack and the receiving gain due to the transistor amplifier included in this assembly is regulated by the operator by means of the volume control knob 1114 extending to the front of the unit.

While only certain embodiments of the invention have been illustrated and described it is to be understood that numerous modifications in the details of arrangement may be resorted to without departing from the true spirit and scope of the invention as defined in the appended claims.

What is claimed is:

1. In combination with a telephone instrument comprising a carbon transmitter and a receiver, circuit connections to said instrument including a pair of conductors, a source of direct current supplying D.C. feed to said carbon transmitter by way of said conductors, a transistor amplifier interposed between said circuit connections and said receiver for amplifying voice currents incoming to said receiver over said connections, said transistor amplifier including a body of semiconductive material and a base, emitter and collector electrode, and a resistance network connected to said conductors at said instrument for supplying said electrodes with D.C. bias potentials from said source.

2. In combination with a telephone instrument comprising a carbon transmitter and a high-impedance receiver, circuit connections to said instrument including a pair of conductors, a source of direct current supplying D.C. feed to said carbon transmitter by way of said conductors, a transistor amplifier interposed between said circuit connections and said receiver for amplifying voice currents incoming to said receiver over said connections, said transistor amplifier including a body of semiconductive material and a base, emitter and collector electrode, a resistance network connected to said conductors at said instrument for supplying said electrodes with D.C. bias potentials from said source, and capacitive equalizing means connected in shunt with said receiver to counteract the overemphasis of higher voice frequencies due to the high inductivity of said receiver.

3. In a telephone system, a substation comprising a transmitter and receiver, a central battery, a transmission bridge including line relay means and said central battery, a subscriber's line, a D.C. circuit extending from said substation over said line to said transmission bridge for operating said line relay means, a transistor amplifier interposed between the substation end of said line and said receiver for amplifying voice currents incoming to said receiver over said line, said transistor amplifier including a body of semiconductive material and a base, emitter and collector electrode, and a resistance network connected into said D.C. circuit at said substation for supplying said electrodes with D.C. bias potentials from said central battery.

4. In a telephone system, a substation comprising a transmitter and receiver, a central battery, a battery feed bridge including line relay means and said central battery, a subscriber's line, a D.C. circuit extending from said substation over said line to said battery feed bridge for operating said line relay means, a transistor amplifier interposed between the substation end of said line and said receiver for amplifying voice currents incoming to said receiver over said line, said transistor amplifier including a body of semiconductive material and a base, emitter and collector electrode, and a resistance network including voltage dividing means connected into said D.C. circuit at said substation for supplying one of the first-mentioned two electrodes with a constant current bias from said central battery.

5. In a telephone system a calling substation, a line, a central battery, line relay means, a D.C. circuit closed upon the initiation of a call at said substation and extending from said substation over said line and said line relay means to said central battery, a called substation, means operated responsive to the answering of said call at said called substation for reversing the direction of current over said D.C. circuit, a transistor amplifier connected to the calling substations end of said line for amplifying voice currents transmitted over said line, said transistor amplifier including a body of semiconductive material and a base, emitter and collector electrode, there being connected into said D.C. circuit at said calling substation a resistance network for supplying said electrodes with D.C. bias potentials from said source, and bridge-type rectifier means for maintaining said bias potentials at a predetermined polarity regardless of the operation of said current reversing means.

6. In a telephone system, a subscriber's line, at one end of said line a substation including a transmitter, a receiver, a switch hook contact and a call indicating device, and at the other end of the line relay means, a central battery, a D.C. circuit closed by said switch hook contact upon the lifting of the receiver at said substation and extending over said line to said line relay means and battery for operating said line relay means, there being also provided at said last-mentioned end a source of alternating current and means operated upon the receipt of a call for said substation for connecting said A.C. by way of said line to said call indicating device, a transistor amplifier connected between the first-mentioned end of said line and said receiver for amplifying voice currents incoming to said receiver over said line, said transistor amplifier including a body of semiconductive material and a base, emitter and a collector electrode, there being connected into said D.C. circuit at said end a resistance network for supplying said electrodes with D.C. bias potentials from said central battery and rectifier means for maintaining said bias potentials at a predetermined polarity irrespective of the polarity of the connection of said battery to said line, said call indicating device and said switch hook contact being connected to said line on the line side of said rectifier means.

7. In a telephone system, a subscriber's line, a source of direct current connected at one end to said line, a substation connected to the other end of said line and comprising a carbon transmitter, a receiver and an induction coil, said coil having three windings connected in series across said line, two of said windings being connected in a mutually aiding sense, the third winding being connected in a sense opposing the first two to act as an anti-side tone winding and said transmitter being connected to a point intermediate said first two windings, a D.C. circuit extending from said source over said line, said first winding and said transmitter in series, a transistor amplifier for amplifying voice currents incoming over said line, said transistor amplifier including a body of semiconductive material and a base, emitter and collector electrode and having a signal input circuit including said base and emitter electrodes and connected in shunt relation to said third winding, and a signal output circuit including one of the last-mentioned two electrodes and said collector electrode and closed through said receiver, voltage dividing means included in said D.C. circuit and being in D.C. circuit connection with each of said electrodes, whereby separate D.C. bias potentials are supplied to said electrodes from said source, and a condenser connected in circuit with said second winding to facilitate the setting up of said separate D.C. potentials.

8. In a telephone system, the combination as defined in claim 7 and wherein a resistance of variable magnitude is connected in series with the electrode common to said signal input and output circuits, thereby to permit controlling the volume of said amplifier by regulating the amount of inverse feedback.

9. In a telephone system, the combination as defined in claim 7 and wherein said transmitter is included in said D.C. circuit extending over said line and is also included in a local circuit extending over said condenser and said second and third winding, said voltage dividing means being included in said D.C. circuit outside of said local circuit.

10. In a telephone system, the combination as defined in claim 7 and wherein said transmitter itself forms one section of said voltage dividing means.

11. In combination, a line and a substation connected to said line, said substation comprising a transmitter and a receiver, both of the permanent magnet type, a multistage transistor amplifier for amplifying signal voltages produced by said transmitter, each of said stages including a body of semi-conductive material and a base, emitter and collector electrode and each having a signal input circuit including the corresponding base and emitter and a signal output circuit including the corresponding collector and one of the other two corresponding electrodes, a direct coupling being provided between two of said stages, said coupling including a direct connection between one of the output electrodes of said first and one of the input electrodes of said second stage, said transmitter being connected in signal transfer relation to the input circuit of said first stage and the output circuit of said first stage including a load resistance and, in series therewith, an equalizing network to compensate for the droop in response of said permanent magnet-type transmitter near the lower end of the voice-frequency range, resistance means interposed in series with the one electrode of the second stage which is included in both the input and output circuit of said stage, so as to produce inverse feedback of signal current in said second stage, and an anti-sidetone induction coil having a plurality of windings, said receiver being differentially connected between said resistance means and one of said windings whereby both the impression of said amplified signal voltages on said receiver and the shunting effect exerted by the input circuit of the second stage on said equalizing network are minimized.

12. In combination, a line and a substation connected to said line, said substation comprising a transmitter and a receiver, both of the permanent magnet type, a multistage transistor amplifier for amplifying signal voltages produced by said transmitter, each of said stages including a body of semi-conductive material and a base, emitter and collector electrode and each having a signal input circuit including the corresponding base and emitter and a signal output circuit including the corresponding collector and one of the other two corresponding electrodes, a direct coupling being provided between two of said stages, said coupling including a direct connection between one of the output electrodes of said first and one of the input electrodes of said second stage, direct current supply means for providing a plurality of points of substantially fixed direct current potential, physical connections from said supply means to the electrodes of said two stages for setting up various bias potentials on the electrodes of said stages, said transmitter being connected in signal transfer relation to the input circuit of said first stage and the output circuit of said first stage including a load resistance and, in series therewith, an equalizing network to compensate for the droop in response of said permanent magnet-type transmitter near the lower end of the voice-frequency range, anti-sidetone means connected between said line and the output circuit of said second stage in balancing relation to said receiver for minimizing impression of said amplified signal voltages on said receiver, and resistance means interposed in common in the physical connections from said supply means to one of the input electrodes of said first stage and to the one electrode of the second stage which is included in both the input and output circuit of said stage, so as to produce direct current inverse feedback over both stages and also produce inverse feedback of signal current in said second stage, whereby the operating points of both stages are stabilized and the shunting effect exerted by the input circuit of the second stage on said equalizing network is minimized.

13. In combination, a line and a telephone instrument connected to said line, said instrument including a transmitter, a receiver, a transistor amplifier for amplifying signal voltages produced by said transmitter, resistance means and an anti-side tone induction coil having three windings, said amplifier comprising a semiconductive body and a base, emitter and collector electrode and having a signal input circuit including said base and emitter and a signal output circuit including said collector and one of the other two electrodes, said transmitter being connected in signal transfer relation to said input circuit, said resistance means being interposed in common into said input and output circuits in series with the last-mentioned electrode to produce inverse feedback of signal current, one of said windings being included in said output circuit only in series with said resistance, another of said windings being in circuit with said line, and said receiver being differentially connected to said resistance means and said third winding, whereby the signal voltage developed across said resistance means and that induced in said third winding are substantially balanced against each other with respect to said receiver.

14. In a telephone system, a substation, a subscriber's line, a central battery, a direct current circuit extending from said battery over said line to said substation, said substation comprising a receiver, a transistor amplifier for amplifying signal voltages produced by said transmitter, voltage dividing means included in said direct current line circuit, resistance means and an anti-side tone induction coil having three windings; said amplifier comprising a semiconductive body and a base, emitter and collector electrode and having a signal input circuit including said base and emitter and a signal output circuit including said collector and one of the other two electrodes, the electrodes of said amplifier also being in D.C. connection with said voltage dividing means, whereby various D.C. potentials are set up at said electrodes, said transmitter being connected in signal transfer relation to said input circuit, said resistance means being interposed in common with said input and output circuits in series with the last-mentioned electrode to produce inverse feedback of both bias and signal current, one of said windings being included in said output circuit only in series with said resistance, another of said windings being included in said line circuit and said receiver being differentially connected to said resistance means and said third winding, whereby the signal voltage across said resistance means and that induced in said third winding are substantially balanced against each other with respect to said receiver.

15. The combination as defined in claim 14, and wherein said induction coil has an air-gap type core for minimizing saturation due to the inclusion of said third winding in said direct current line circuit, and wherein there is provided an inductance in shunt connection, as to signal currents, with respect to said resistance means, whereby the balance of the differential connection of said receiver is maintained for signal current at the lower end of the voice frequency range, in spite of the relatively low reactance presented by said induction coil to signal voltages at such lower frequencies.

16. In a telephone system, a line, two transistor amplifiers for amplifying voice currents outgoing over and incoming from said line respectively, each of said amplifiers including a body of semiconductive material and a base, emitter and collector electrode and each having a signal input and a signal output circuit, the signal input circuit of said outgoing amplifier including its base and emitter and the signal output circuit of said amplifier including its collector and one of the other two electrodes and balancing means for minimizing impression of the output signal of said outgoing amplifier on the input circuit of said incoming amplifier, said means including a resistance common to the signal input and output circuits of said outgoing amplifier and connected in series with the last-mentioned electrode to provide for inverse feedback of the signal current of said amplifier and also including a transformer having three windings, one of said windings being included in the output circuit of said outgoing amplifier in series with said resistance, another of said windings being included in said line, and the input circuit of said incoming amplifier being differentially connected to said resistance and said third winding, whereby the signal voltage of said outgoing amplifier developed across said resistance and that induced in said third winding are balanced against each other with respect to the input circuit of said incoming amplifier.

17. In combination, a line and a telephone instrument connected to said line, said instrument including a transmitter, a receiver, a multi-stage transistor amplifier for amplifying signal voltages produced by said transmitter, resistance means and an anti-sidetone induction coil having three windings, each of said stages including a semiconductive body and a base, emitter and collector electrode and each having a signal input circuit including the corresponding base and emitter and a signal output circuit including the corresponding collector and one of the other two corresponding electrodes, a direct coupling between two of said stages and including a direct connection between one of the output electrodes of said first and one of the input electrodes of said second stage, direct current supply means for providing a plurality of points of substantially fixed direct current potential, physical connections from said supply means to the electrodes of said two stages for setting up various bias potentials on the electrodes of said stages, said transmitter being connected in signal transfer relation to the input circuit of the first stage, said resistance means being interposed in common in the physical connections from said supply means to one of the input electrodes of said first stage and to the one electrode of the second stage which is included in both the input and output circuit of said stage, so as to produce direct current inverse feedback over both stages and also produce inverse feedback of signal current in said second stage, one of said windings being included in said output circuit only in series with said resistance means, another of said windings being in circuit with said line, and said receiver being differentially connected to said resistance means and said third winding, whereby the signal voltage developed across said resistance means and that induced in said third winding are substantially balanced against each other with respect to said receiver.

18. In combination with a telephone instrument comprising apparatus for translating electric energy into acoustic energy and apparatus for translating acoustic energy into electric energy, circuit connections to said instrument including a pair of conductors, a central battery for supplying direct current to said instrument by way of said conductors, a transistor amplifier interposed between said circuit connections and said first-mentioned apparatus for amplifying alternating currents of voice frequency incoming to said first-mentioned apparatus over said connections, said transistor amplifier including a body of semi-conductive material having a base, emitter and collector electrodes, and resistance means connected to said conductors at said instrument for supplying said electrodes with direct current bias potentials from said central battery.

19. In combination with a telephone substation comprising apparatus for translating electric energy into acoustic energy and apparatus for translating acoustic energy into electric energy, a subscriber line, a central battery for supplying said substation with direct current by way of said line, a transistor amplifier interposed between said line and said first-mentioned apparatus for amplifying alternating currents of voice frequency incoming to said first-mentioned apparatus over said line, said transistor amplifier including a body of semi-conductive material having a base, emitter and collector electrodes, and resistance means connected to said line at said substation for supplying said electrodes with direct current bias potentials from said central battery.

References Cited in the file of this patent

UNITED STATES PATENTS

| | | |
|---|---|---|
| 1,654,929 | Foley | Jan. 3, 1928 |
| 1,655,537 | Foley | Jan. 10, 1928 |
| 1,696,274 | Johnson | Dec. 25, 1928 |
| 2,059,714 | Sengebush | Nov. 3, 1936 |
| 2,186,072 | Huth | Jan. 9, 1940 |
| 2,332,430 | Berger | Oct. 19, 1943 |
| 2,341,539 | Giannini | Feb. 15, 1944 |
| 2,535,681 | Johnson | Dec. 26, 1950 |
| 2,641,327 | Balmer | June 9, 1953 |
| 2,652,460 | Wallace | Sept. 15, 1953 |
| 2,660,624 | Berson | Nov. 24, 1953 |
| 2,760,007 | Lozier | Aug. 21, 1956 |
| 2,762,867 | Meacham | Sept. 11, 1956 |
| 2,762,875 | Fischer | Sept. 11, 1956 |
| 2,785,231 | Chase | Mar. 12, 1957 |
| 2,787,670 | Rowland | Apr. 2, 1957 |